S. H. COPE.
ROAD VEHICLE WHEEL.
APPLICATION FILED JUNE 6, 1912.

1,088,540.

Patented Feb. 24, 1914.
2 SHEETS—SHEET 1.

WITNESSES
Sidney Brooks
J. P. Davis

INVENTOR
Sidney Halbert Cope
BY
Munn & Co
ATTORNEYS

S. H. COPE.
ROAD VEHICLE WHEEL.
APPLICATION FILED JUNE 5, 1912.

1,088,540.

Patented Feb. 24, 1914.
2 SHEETS—SHEET 2.

WITNESSES
Sidney Brooks
J. P. Davis

INVENTOR
Sidney Halbert Cope
BY Munn & Co
ATTORNEYS

UNITED STATES PATENT OFFICE.

SIDNEY HALBERT COPE, OF BIRMINGHAM, ENGLAND, ASSIGNOR TO THE WARLAND DUAL RIM COMPANY LIMITED, OF BIRMINGHAM, ENGLAND.

ROAD-VEHICLE WHEEL.

1,088,540.   Specification of Letters Patent.   Patented Feb. 24, 1914.

Application filed June 5, 1912. Serial No. 701,786.

*To all whom it may concern:*

Be it known that I, SIDNEY HALBERT COPE, subject of the King of Great Britain, residing at Alma street, Aston, in the city of Birmingham, England, works manager, have invented certain new and useful Improvements Relating to Road-Vehicle Wheels, of which the following is a specification.

This invention has for its object to construct an improved motor or other road vehicle wheel, of the type in which a detachable rim is employed, said rim having a radially or laterally movable segment for facilitating application and removal of the tire to and from the rim.

The invention comprises the securing of the detachable rim and segment by flanges or their equivalent (one of which is detachable) adapted to embrace the portions of the rim which engage the beaded edges of the tire cover and produce when drawn together a circumferential contraction of the said rim whereby the ends of the rim at the transverse incision or the segmental part or parts are pressed tightly together and caused to form a close joint.

Figure 1:
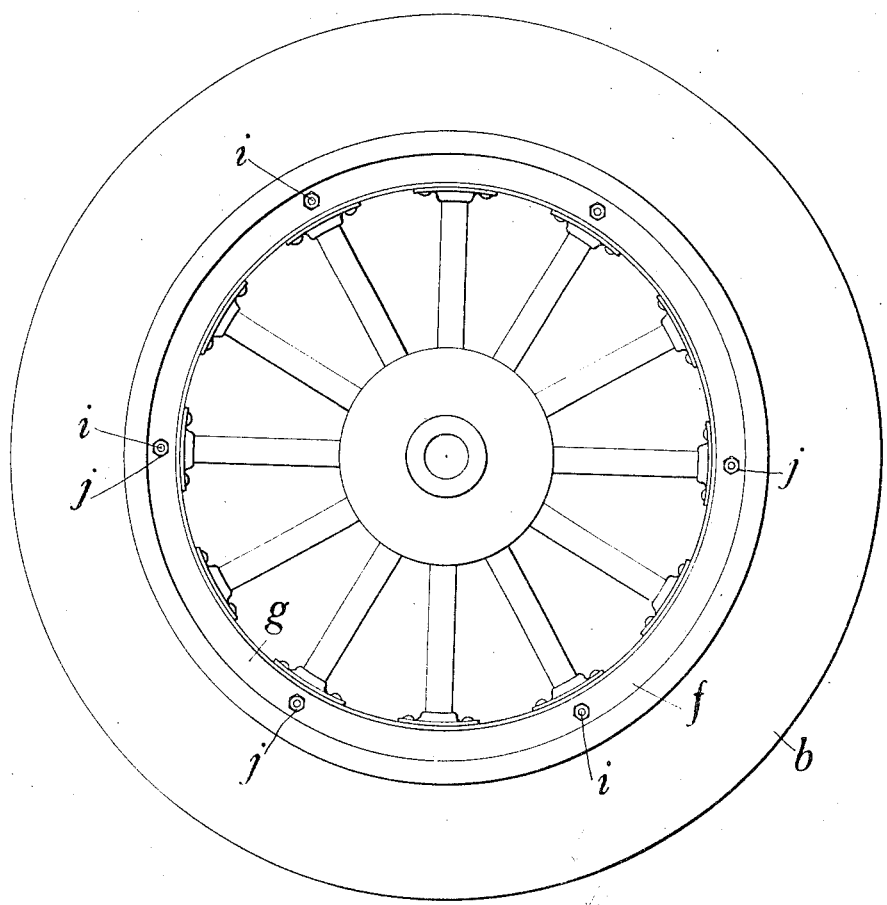
Figure 2:
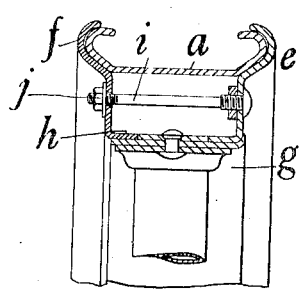
Figure 3:
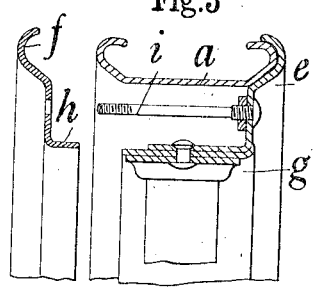
Figure 4:
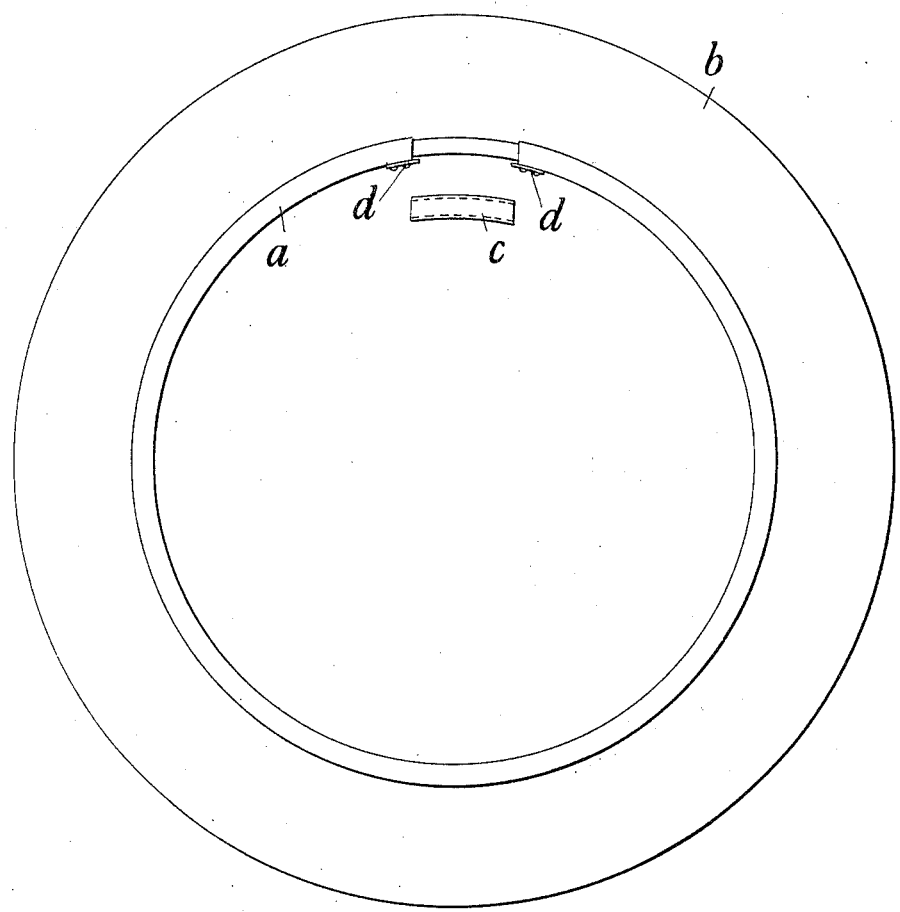
Figure 5:
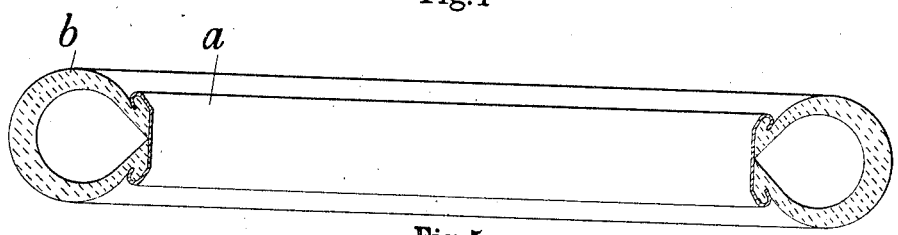

Referring to the two accompanying sheets of explanatory drawings:—Figure 1 is a side elevation of a motor vehicle wheel constructed in accordance with this invention. Fig. 2 is a transverse section through the rim and Fig. 3 a similar view showing the detachable flange separated from the rim. Fig. 4 is an elevation of the detachable rim and pneumatic tire, and Fig. 5 is a transverse section of the rim and tire.

The same reference letters in the different views indicate the same part.

In constructing a motor road vehicle wheel in accordance with this invention, the detachable rim *a* is rolled from sheet metal to the usual annular form having inwardly turned edges adapted to engage with the beaded edges of the tire cover *b*. The rim is also formed with a short transverse gap into which is fitted a radially movable segment *c*.

To detach the tire after deflation the segment is removed and the rim can then be contracted sufficiently to permit the tire cover to be conveniently sprung away.

Any known means may be employed for contracting the rim, such as a right and left hand screw and nut device fitted with a ratchet handle and adapted to engage apertures or lugs formed on the inner periphery of the rim. A short lip or plate *d* may be secured to each edge of the gap in the rim upon which the segment *c* can rest when in position, but the plates *d* are not essential. In Fig. 4 the segment *c* is shown detached from the rim. It will be understood that in the service position it occupies the gap between the ends of the rim.

For securing the detachable rim *a* to the center of the wheel the periphery of the latter is formed from a pair of flanged metal elements *e* and *f* which may be conveniently produced by stamping operations on metal sheet. One of the elements (*e*) is adapted to be secured to the felly *g* of the wheel center and is shaped to form one side and the base of an annular peripheral channel between the rim *a* and the felly *g*. The outer periphery of the said side is also shaped to provide an annular groove or recess which may have a configuration similar to that of the adjacent inturned edge of the rim. The detachable flange *f* forms the removable side of the annular channel aforesaid between the wheel center and the rim, and is also shaped to provide a groove which can receive the other inturned edge of the rim. To insure proper centering of the detachable flange it may be formed with a lip *h* adapted to slip on to the wheel felly as shown in Fig. 2. The said detachable flange is secured by bolts *i* passing through the same and the fixed flange and nuts *j* or in any other convenient manner.

When the rim is placed in position between the two flanges *e* and *f* on the wheel center it occupies the grooves in the flanges and is practically inclosed thereby. The shape of the grooves in the flanges may be such that when they are drawn together they impose on the inturned edges of the rim a radial pressure in an inward direction which contracts the rim circumferentially and so produces a water tight joint at the ends of the detachable segment. It is not, however, essential to specially shape the grooves to produce an inward radial pressure as it is found that when the bolts are situated between the wheel felly and the rim and provision is made whereby the flanges can be drawn together to a slightly greater extent at their outer edges than at their inner circumference a contracting effect is produced on the rim. With flanges as above described the detachable segment is also securely held in position so that no screws or like fastenings are required therefor.

By this invention I am able to construct a motor road vehicle wheel with a detachable rim in an extremely simple manner, and readily provide all the necessary security as well as facility for manipulating the tire. The invention is applicable to wire spoke wheels as well as to steel or wood artillery wheels and is not limited to the particular construction herein described as this may be varied for different services. In all cases, however, the flanges grip the detachable rim and its segment in such a manner that it is impossible for the rim to expand and become detached, and the removable segment is fixed against any possibility of accidental dislodgment.

Having thus described my invention what I claim as new and desire to secure by Letters Patent is:—

1. In road vehicle wheels, the combination comprising a wheel felly, a divided detachable rim formed with inturned edges embracing the tire, a detachable segment situated in and having the same section as the rim, and flanges on the felly formed with grooves adapted to completely embrace the said inturned edges of the detachable rim and to exert on the rim a circumferential contracting effect, the said segment being held in position in the rim by the said flanges on the felly, substantially as described.

2. In road vehicle wheels, the combination comprising a wheel felly, a divided detachable rim formed with inturned edges embracing the tire, a detachable segment situated in and having the same section as the rim, flanges on the felly formed with grooves adapted to completely embrace the said edges of the detachable rim, and bolts situated between the felly and the detachable rim and adapted to draw the said flanges together on to the opposite edges of the said rim, the said segment being held in position in the rim by the said flanges on the felly, substantially as described.

3. In road vehicle wheels, the combination comprising a wheel felly, a divided detachable rim formed with inturned edges embracing the tire, a detachable segment situated in and having the same section as the rim, a lip on each adjacent end of the rim whereon the segment can rest, a flange permanently secured to the felly and a flange detachably secured to the felly, said flanges being formed with peripheral grooves which completely embrace the opposite inturned edges of the rim, and fastening bolts situated between the felly and the detachable rim and adapted to draw the flanges together on to the opposite edges of the said rim, the said segment being held in position in the rim by the said flanges on the felly, substantially as described.

In testimony whereof I have signed my name to this specification in the presence of two subscribing witnesses.

SIDNEY HALBERT COPE.

Witnesses:
EDWARD LILL,
FRANCIS MALPAS.